A. C. Flanders,
Animal Trap.

No. 91,427. Patented June 15, 1869.

Witnesses
C. A. Pettit
S. C. Kenyon

Inventor
A. C. Flanders
by Munn & Co.
Attorneys

United States Patent Office.

A. C. FLANDERS, OF OWATONNA, MINNESOTA.

Letters Patent No. 91,427, dated June 15, 1869.

---

IMPROVED ANIMAL-TRAP.

---

The Schedule referred to in these Letters Patent and making part of the same.

---

*To all whom it may concern:*

Figure 1:
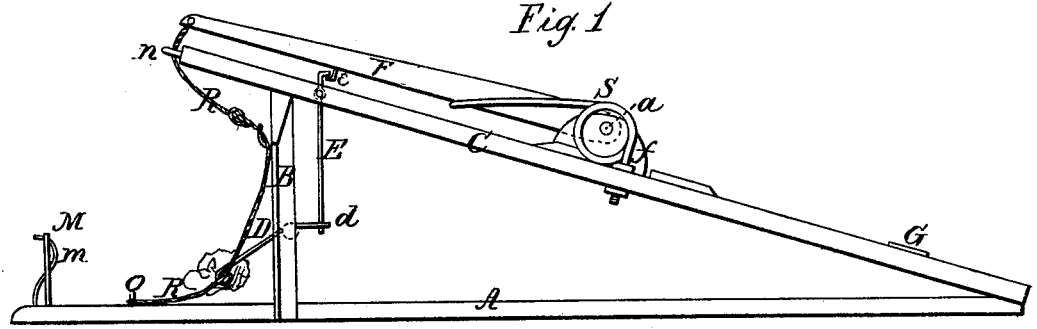

Be it known that I, A. C. FLANDERS, of Owatonna, in the county of Steele, and State of Minnesota, have invented a new and improved Animal-Trap; and I do hereby declare that the following is a full, clear, and exact description of the construction and operation of the same, reference being had to the accompanying drawings, making a part of this specification, in which Figure 1 is a side view.

Figure 2:
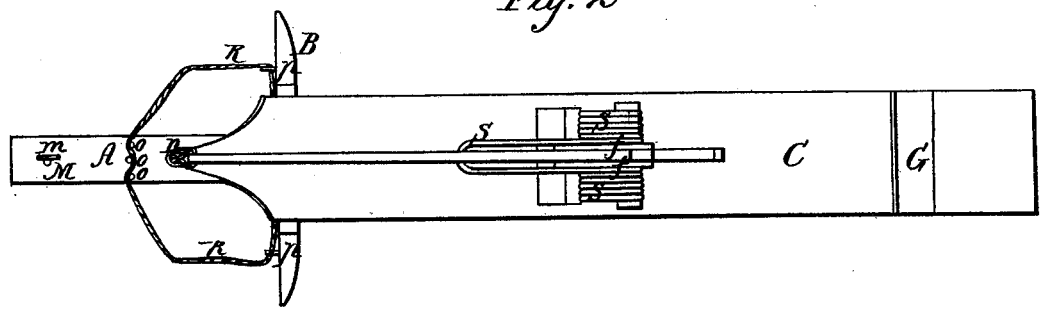

Figure 2 is a top view.

This invention relates to that class of animal-traps provided with a slip-noose, and operated by a spring-arm.

The present improvement consists in the peculiar construction and arrangement of the spring-arm, noose, catch, and bait-hook, whereby the parts operate in a peculiar manner, and with several important advantages over traps of this class heretofore brought into public use.

In the drawings—

A is a base-board, which supports an upright board, B, and an inclined wooden strip, C.

D is the bait-hook, extending through a slot in the upright plate B, where it is pivoted, as shown in fig. 1, its rear end being formed into a loop, $d$, and its front end adapted for holding the bait, shown in red, fig. 1.

E is a rod, pivoted to the incline C, and extending down slightly below the loop $d$, so that by depressing the latter a little, the lower end of the rod may be inserted into the loop, as shown in fig. 1, or removed therefrom. The upper end of the rod is bent down, as seen in fig. 1, to form a catch for setting the trap.

F is a lever, or arm, pivoted between lugs $f\ f$, attached to the upper side of the incline C, and capable of being bent back to the position shown in fig. 1, or of being, by the operation of a spring, S, thrown forward, so that its free end will rest upon the metal strap G at the lower end of the incline.

R is the string in which the noose is formed, its upper end being attached to the free end of the arm F, whence it passes down through an eye, or staple, $n$, in the end of the incline C, and is formed into the noose beneath.

When the trap is set for game, the noose is simply hung on the pins $p\ p$ projecting from the front side of the plate B.

When set for mice, and other vermin or animals of small size, the noose is adjusted on said pins, and between the pins $o\ o\ o$, as shown in fig. 2.

When set for birds, &c., the bight of the noose is brought forward over a short post, M, where it is held by a spring, $m$, so that the noose will be brought in a straight line from the post M to the staple $n$, and, when operated, will catch the birds by the neck, near the head.

The arm F is provided with a hook, $e$, which engages with the rod E, to set the trap, in the manner shown in fig. 1.

The operation of this improved trap will be understood from the drawings, without further description.

Its peculiar advantages over other traps of the same class lie in the arrangement of the incline and arm F, in connection with the noose R leading through the staple $n$, the effect of which arrangement is, first, to give the spring-arm great velocity at the commencement of its movement, so as to insure the catching of the animal, and great power toward the end of its movement, so as to insure the killing of the game, the arm and cord operating, toward the end of the movement, like a toggle-joint lever. In the second place, when the arm has been fully operated, and lies flat on the strap G, the cord draws back longitudinally, with relation to it, passing slightly under its pivot $a$, so that the draught upon the cord, caused by the struggles of the animal or otherwise, only serves to lock the spring-arm down, and prevent the escape of the game.

These two features, which do not add to the cost of the trap, give it great certainty, and efficiency of operation.

Having thus described my invention,

What I claim as new, and desire to secure by Letters Patent, is—

The arrangement of the incline C, arm F, spring S, staple $n$, cord R, and catch-apparatus $e$ E D, when said parts are constructed to operate substantially in the manner and for the purposes specified.

A. C. FLANDERS.

Witnesses:
 J. B. SEARLES,
 A. C. HICKMAN.